June 1, 1954     J. E. WICKLATZ     2,680,138
PROCESS FOR PREPARING TERTIARY-BUTYLISOPROPYLBENZENE HYDROPEROXIDE
Filed Nov. 25, 1949
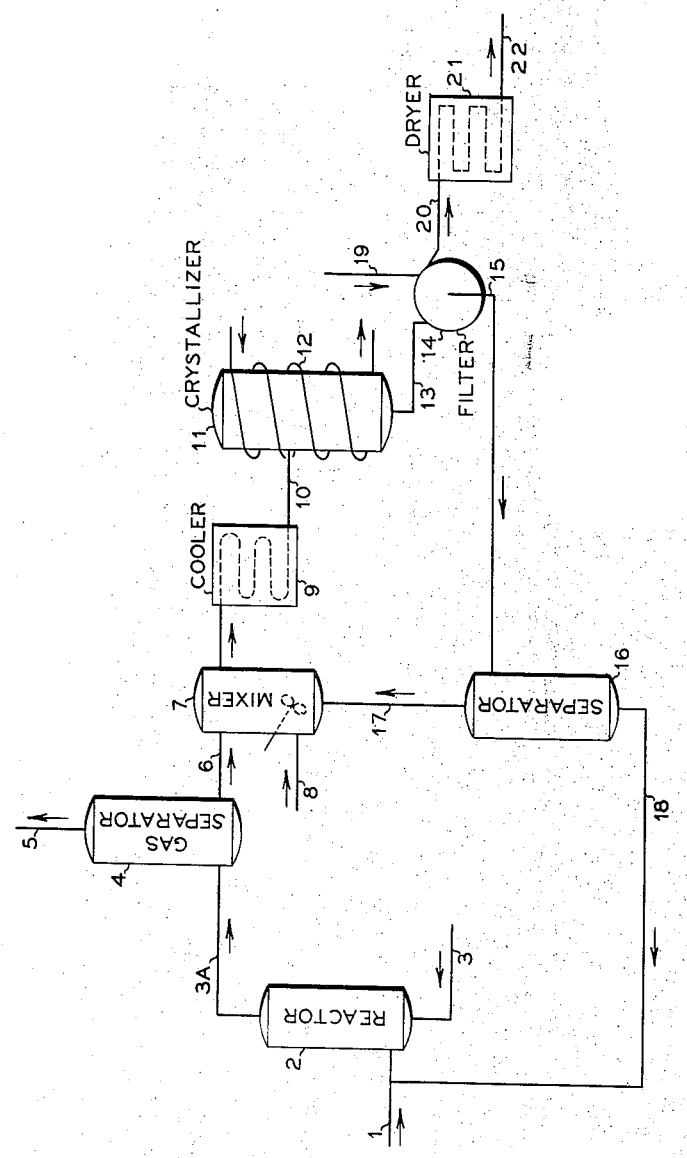
*INVENTOR.*
JOHN E. WICKLATZ
BY
*ATTORNEYS*

Patented June 1, 1954

2,680,138

UNITED STATES PATENT OFFICE 2,680,138

PROCESS FOR PREPARING TERTIARY-BUTYLISOPROPYLBENZENE HYDROPEROXIDE

John E. Wicklatz, Bartlesville, Okla., assignor to Phillips Petroleum Company, a corporation of Delaware Application November 25, 1949, Serial No. 129,474

9 Claims. (Cl. 260—610)

This invention relates to a novel compound, namely, tert-butylisopropylbenzene hydroperoxide. In one of its aspects, this invention relates to a process for producing tert-butylisopropylbenzene hydroperoxide. In still another of its aspects this invention relates to a process for the production of tert-butylisopropylbenzene hydroperoxide by oxidation of tert-butylisopropylbenzene and to the separation of the resulting product through the use of novel recovery procedure whereby improved yields of a substantially pure crystalline product are obtained. In still yet another of its aspects this invention relates to a process for the separation of tert-butylisopropylbenzene hydroperoxide from a mixture of other oxidized and non-oxidized hydrocarbons.

In the prior art, the controlled oxidation of hydrocarbons with an oxygen containing gas is well-known and various operating procedures have been disclosed for effecting such oxidations. One of the products so obtained is the hydroperoxide of the hydrocarbon oxidized. These hydroperoxides are, in many instances, liquids at ordinary temperatures and, being thermally unstable, are usually obtained and used as solutions in the parent hydrocarbon rather than being isolated, say by a fractional distillation process. Distillation of solutions of these hydroperoxides subjects them to elevated temperatures which, on account of their unstable character, is hazardous. Further, it is well-known that these hydroperoxides tend to decompose when they are separated by simple fractional distillation and, as a result, there is a considerable loss of the desired hydroperoxide product.

It has now been found that a new hydrocarbon hydroperoxide, namely tert-butylisopropylbenzene hydroperoxide, can be produced and that this new hydroperoxide has properties which differ in several unexpected respects from the known hydrocarbon hydroperoxides having similar molecular structure. For example, tert-butylisopropylbenzene hydroperoxide is a crystalline solid at ordinary room temperature and also has limited solubility in hydrocarbons, including the parent hydrocarbon. Triisopropylbenzene hydroperoxide has been obtained as a solid in high purity but this material is somewhat soluble in the parent hydrocarbon or other hydrocarbons. This new hydroperoxide is valuable as an organic synthesis intermediate and more particularly as an ingredient in an emulsion polymerization process for the production of synthetic rubber.

It has also been found that tert-butylisopropylbenzene hydroperoxide can be produced by oxidizing tert-butylisopropylbenzene at an elevated temperature with an oxygen containing medium, e. g. air. The oxidation reaction can be illustrated by the following equation:

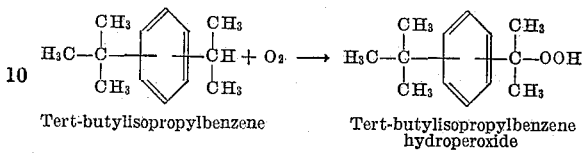

Tert-butylisopropylbenzene     Tert-butylisopropylbenzene hydroperoxide

Further, it has been found that this particular oxidation reaction is often difficult to initiate and that the addition of minor amounts of an organic peroxide or hydroperoxide or the alkali metal salts of the latter will readily initiate the oxidation reaction.

It has still further been found that, due to the crystalline nature of the tert-butylisopropylbenzene hydroperoxide product, efficient recovery of such product from admixture with hydrocarbon oxidation effluents is difficult by ordinary filtration methods since the major portion of the product remains dissolved in the filtrate. Moreover, the minor portion of the product which is recovered by such ordinary methods is impure. However, according to this invention, the major portion of tert-butylisopropylbenzene hydroperoxide which is admixed with the hydrocarbon oxidation effluent can be readily recovered by admixing a low boiling hydrocarbon with the oxidation effluent, cooling the mixture thus formed to a sub-zero temperature and then filtering the liquid products from the crystalline tert-butylisopropylbenzene. When operating in this manner, a major portion of the tert-butylisopropylbenzene, generally 70 per cent or more of that present, can be recovered from the oxidation effluents in a single crystallization and filtration. The increased yields obtained by employing the low boiling hydrocarbon often amount to 150 to 175 per cent more than those realized when such hydrocarbon is not employed.

Thus, according to this invention, there has been discovered and provided a novel compound, namely, tert-butylisopropylbenzene hydroperoxide. Also, according to this invention, there is provided a process for the preparation of tert-butylisopropylbenzene hydroperoxide comprising oxidizing tert-butylisopropylbenzene with an oxygen containing medium at an elevated temperature in the presence of an organic peroxide or hydroperoxide reaction initiator to thereby produce the said hydroperoxide in excellent yields without substantially any concomitant formation of tars or polymers. Still further according to this invention, there is provided a process for the separation of the tert-butylisopropylbenzene product thus formed from the hydrocarbon oxidation effluent comprising admixing a low boiling hydrocarbon with the said effluent, cooling the resulting mixture to a sub-zero temperature and then filtering the crystalline product therefrom to thereby recover the major portion of the tert-butylisopropylbenzene hydroperoxide thus formed in a single crystallization and filtration.

In order to more fully describe the invention, it will be described in one of its embodiments with particular reference to the attached drawing. In the drawing, tert-butylisopropylbenzene is passed through line 1 into reactor 2 and an oxygen containing medium, for example, air, is passed through line 3 into reactor 2 and therein intimately admixed with the tert-butylisopropylbenzene. About 0.3 weight per cent of an oxidation initiator, which, in this particular case is the potassium salt diisopropylbenzene hydroperoxide is admixed with the hydrocarbons in line 1. Reactor 2 is maintained at an elevated temperature in the range of between 150° and 400° F., preferably between 200° and 300° F., still more preferably between 230° and 280° F. The pressure in reactor 2 can be from about 1 to as high as 100 atmospheres, or even higher, if desired. Preferably, the pressure is maintained sufficiently high to insure liquid hydrocarbon phase conditions in reactor 2. The amount of oxygen containing medium introduced into reactor 2 will depend upon the desired degree of conversion of the tert-butylisopropylbenzene to tert-butylisopropylbenzene hydroperoxide. Usually it is desired to pass sufficient oxygen into the reactor so that the oxidized effluent will contain at least about 5 per cent, preferably between 5 and 30 per cent of the desired hydroperoxide. Thus the amount of oxygen which will be consumed will range from about 0.05 mol to about 0.35 mol, per mol of hydrocarbon introduced through line 1. Obviously, the oxygen in the feed can exceed these amounts considerably. However, with a large excess of oxygen, deleterious effects can be observed in both the quality of product and the yield.

After the desired degree of conversion has been accomplished in reactor 2, the oxidation effluent is passed through line 3A to gas separator 4 wherein any light gases such as unreacted oxygen, nitrogen, light hydrocarbons, etc., are removed through line 5. The degasified oxidation effluent is then passed through line 6 to mixer 7. A low boiling hydrocarbon is passed through line 8 into mixer 7 wherein it is admixed with the oxidation effluent preparatory to the separation step described more fully below.

After being admixed with the low boiling hydrocarbon, the oxidation effluent is passed through cooler 9 wherein it is cooled to a sub-zero temperature, preferably between minus 100° and minus 15° F., still more preferably between minus 60° and minus 30° F., and still yet more preferably minus 55° and minus 35° F. The cold mixture is then passed through line 10 to crystallizer 11 wherein it is retained for a period of time sufficient to permit substantially complete crystallization of the tert-butylisopropylbenzene hydroperoxide product. Usually, complete crystallization is accomplished after about 10 minutes to about 5 hours residence time in crystallizer 11. Crystallizer 11 is preferably jacketed with a cooling coil 12 in order to maintain sub-zero temperatures therein. Cooling coil 12 can be supplied with any desirable refrigerant such as ammonia, low boiling hydrocarbons, etc. The crystalline tert-butylisopropylbenzene hydroperoxide while in suspension in the mixture of low boiling hydrocarbon and unconverted hydrocarbon from reactor 2 is passed through line 13 to filter 14 wherein liquid products, including the low boiling hydrocarbon and the unoxidized hydrocarbons from reactor 2, are removed through line 15 and passed to separator 16. In separator 16, the low boiling hydrocarbon is removed via line 17 and can be recycled to mixer 7 or returned to storage. Unreacted tert-butylisopropylbenzene is removed through line 18 and can be recycled to line 1 for further treatment in oxidation reactor 2. In some instances, it is desirable to pass the recycle stream in line 18 through a purification system (not shown) to remove accumulated impurities therefrom. The filter cake of crystalline tert-butylisopropylbenzene hydroperoxide separated on filter 14 is substantially pure. However, further purification of the hydroperoxide product can be secured by washing the filter cake with a low boiling hydrocarbon supplied through line 19 in order to remove any impurities such as unconverted tert-butylisopropylbenzene hydroperoxide. The washed filter cake is then passed by conveyor 20 to dryer 21 wherein it is heated to a temperature less than 100° F., preferably from about 25° to about 80° F., thereby accomplishing substantially complete drying of the filter cake. The crystalline tert-butylisopropylbenzene hydroperoxide product is then removed from dryer 21 by conveyer 22 and sent to storage.

*Example*

A run was made in which 100 ml. of tert-butylisopropylbenzene was charged to an oxidation reactor fitted with an efficient agitation means and a reflux condenser. The temperature within the reactor was elevated to 257° F. after which about 0.46 gram of the potassium salt of diisopropylbenzene hydroperoxide was added to serve as an initiator. Oxygen was passed through the mixture of hydrocarbon and initiator for five hours at which time an analysis of a sample of the oxidized mixture showed a hydroperoxide content of 16.05 per cent.

The effluent from the above described run was combined with those of other similar runs to provide a total of 1000 ml. of material containing 94 grams (by analysis) of tert-butylisopropylbenzene hydroperoxide. The combined effluents were then divided into two equal portions of 500 ml. each.

First separation procedure:

The first 500 ml. portion was mixed with an equal volume of n-pentane and cooled to −40° F. A crystalline precipitate was formed immediately. This crystalline material was removed from its suspending liquid by a cold filter and thereafter was shaken with 100 ml. of n-pentane to wash out hydrocarbon soluble impurities, cooled again to −40° F. and filtered. The thus washed crystalline product was then dried in open air for 18 hours to yield 43.5 grams of crystals which had a tert-butylisopropylbenzene content of 78.2 per cent by weight. Filtrate resulting from the first filtration had a content of 12.3 grams of hydroperoxide. Approximately 0.9 gram of hydroperoxide was found in the pentane used for washing.

Second separation procedure:

The second 500 ml. portion of the oxidation effluent was cooled to −40° F. and filtered without any n-pentane being admixed therewith. This filtration was made using a basket type centrifuge since the viscous nature of the material precluded filtration by ordinary means. The solid crystalline material resulting from the filtration was shaken with 100 ml. of n-pentane to wash out hydrocarbon soluble impurities, again cooled to −40° F. and filtered with cold funnel. The washed filter cake was air dried for 18 hours to yield 16 grams of crystalline product which had a tert-butylisopropylbenzene hydroperoxide content of 79.1 weight per cent. The filtrate from the first filtration had a hydroperoxide content of 30.2. About 0.3 gram of hydroperoxide was found in the pentane used for washing.

A summary of the results of the two recovery procedures is shown in the tabulation below.

|  | Procedure 1 | Procedure 2 |
|---|---|---|
| TBIBH* recovered as solid (wt. percent of Total) | 72.5 | 27.0 |
| TBIBH* in 1st filtrate (wt. percent of Total) | 26.2 | 64.3 |
| TBIBH* in pentane wash (wt. percent of Total) | 1.3 | 0.6 |
| TBIBH* unaccounted for (wt. percent of Total) | 0.0 | 8.1 |

*Tert-butylisopropylbenzene hydroperoxide.

The crystalline product obtained by both procedures upon recrystallization from n-pentane, yielded crystals having a tert-butylisopropylbenzene hydroperoxide content of 92.5 weight per cent.

As described, it is preferable to admix small amounts of an oxidation initiator with the tert-butylisopropylbenzene feed prior to its introduction into oxidation reactor 2. Initiators which can be satisfactorily employed are the organic peroxides or hydroperoxides and the alkali metal salts of the latter. Particularly suitable are the hydrocarbon peroxides and hydroperoxides and the metal salts thereof. Still more particularly, it is preferred to employ diisopropylbenzene, tert-butylisopropylbenzene and triisopropylbenzene hydroperoxide as well as the potassium and sodium salts thereof. Since it is known that the reaction is autocatalytic, these materials will obviously operate to start the oxidation reaction. The quantity of initiator employed can be quite small, that is, from about 0.25 to about 1, preferably from about 0.3 to about 0.5, weight per cent of the tert-butylisopropylbenzene charged, although larger amounts can be employed if desired. Alternatively, a portion of the filtrate containing unseparated tert-butylisopropylbenzene hydroperoxide being recycled through line 18 to line 1 and oxidation reactor 2 can serve as a source of initiator when desired. In such case, it is desirable to add a small amount of basic material, for example, sodium carbonate, sodium hydroxide, etc., to the recycle in line 18 in order to neutralize acids which may be formed as secondary oxidation products in reactor 2. This basic material also acts to form a metal salt of the tert-butylisopropylbenzene hydroperoxide contained in recycle stream 18 which salt in turn serves as initiator to start the oxidation reaction. Usually an amount of basic material from about 0.25 to about 2.5 weight per cent of the hydrocarbon charge to reactor 2 will be sufficient.

In the step of admixing a light hydrocarbon with the oxidation effluent from the oxidation reactor as described above, any saturated light hydrocarbon having from 4 to 8 carbon atoms or a mixture of such hydrocarbons can be employed. Generally, it is preferred to employ n-pentane because it has a sufficiently low boiling point to permit ready removal by vaporization from the crystalline product and yet requires no special, vapor-tight equipment for its handling. The butanes, while requiring special equipment for their handling, have the advantage of easy removal from the crystalline product after the washing step. When operating with the heptanes or octanes, it is usually desirable to employ a low pressure of vacuum drying stage to facilitate removal of these hydrocarbons from the crystalline product without employing elevated temperatures. The amount of light hydrocarbon to be employed will depend somewhat upon the exact hydrocarbon selected and upon the concentration of tert-butylisopropylbenzene hydroperoxide in the oxidation effluent. However, it has been found satisfactory to apply from 0.2 to 5, preferably from 0.5 to 2, volumes of light hydrocarbon per volume of oxidation effluent.

It is a significant advantage of this invention that the major portion of the tert-butylisopropylbenzene hydroperoxide in solution in the effluent stream from the tert-butylisopropylbenzene oxidation reactor is recovered by a single crystallization step when practicing the process of this invention. Thus, when the oxidation effluent stream is admixed with a light hydrocarbon, the recovery of tert-butylisopropylbenzene hydroperoxide therefrom by a single crystallization is usually 70 percent or more of theoretical and the loss of product in the filtrate is correspondingly small. In the absence of a light hydrocarbon, the recovery of tert-butylisopropylbenzene hydroperoxide in a single crystallization step is usually less than 30 percent of theoretical. Hence, it is necessary, in the absence of a light hydrocarbon, to perform a multiplicity of reconcentration and recrystallization steps in order to recover as much as 70 per cent or more of theoretical. Therefore, the practice of this invention results in a simplicity of operation not otherwise possible. Still another advantage to be derived from the practice of this invention lies in the speed and efficiency of the filtration of the tert-butylisopropylbenzene hydroperoxide crystals from the filtrate when employing a light hydrocarbon admixed with the oxidation effluent. When sufficient amounts of this light hydrocarbon are employed, the filtration can be rapidly effected by conventional filtering means such as a rotary filter, filter press, etc. without any special skill or care being exercised. On the other hand, when operating without any light hydrocarbon, the filtration of the hydroperoxide crystals from the mother liquor is very slow and will usually require the use of a centrifugal separation device or similar means to effect a recovery of the crystals.

Reasonable variation and modification are possible within the scope of this disclosure and the appended claims to the invention the essence of which is that there is provided a new compound, namely, tert-butylisopropylbenzene hydroperoxide; that there is provided a process for producing such a compound comprising oxidizing tert-butylisopropylbenzene with an oxygen containing medium in the presence of an organic peroxidic or hydroperoxidic reaction initiator whereby the desired product is produced in high yields without the concomitant formation of tars and polymers and that there is further provided an additional step for recovering the tert-butylisopropylbenzene hydroperoxide from admixture with the oxidation effluent which comprises admixing a low boiling hydrocarbon with said effluent, cooling said mixture to a sub-zero temperature and then filtering the crystalline product from the cold liquors.

I claim:

1. A process for producing tert-butylisopropylbenzene hydroperoxide which comprises passing tert-butylisopropylbenzene admixed with about 4.6 grams of the potassium salt of diisopropylbenzene hydroperoxide per liter of said tert-butylisopropylbenzene to an oxidation zone, adding an oxygen-containing medium to said zone, maintaining said zone at a temperature of about 257° F., passing the resulting oxidized effluent from said oxidation zone to a separation zone, admixing an equal volume of n-pentane with said oxidation effluent, cooling the last said mixture to a temperature of about minus 40° F., filtering the thus formed crystals of tert-butylisopropylbenzene hydroperoxide from the remainder of the mixture, washing said separated crystals with additional n-pentane and drying the resulting substantially pure crystalline tert-butylisopropylbenzene hydroperoxide.

2. A process for producing tert-butylisopropylbenzene hydroperoxide which comprises passing tert-butylisopropylbenzene admixed with about 0.3 to 0.5 weight per cent of tert-butylisopropylbenzene hydroperoxide to an oxidation zone, adding an oxygen-containing medium to said zone, maintaining said zone at a temperature of about 200° to about 300° F., passing the resulting oxidation effluent from said oxidation zone to a separation zone, admixing from 0.5 to 2 volumes of n-pentane with each volume of said oxidation effluent, cooling the last said mixture to a temperature between minus 60° and minus 30° F., filtering the thus formed crystals of tert-butylisopropylbenzene hydroperoxide from the remainder of the mixture, washing said separated crystals with additional n-pentane and drying the resulting substantially pure crystalline tert-butylisopropylbenzene hydroperoxide.

3. A process for producing tert-butylisopropylbenzene hydroperoxide which comprises passing tert-butylisopropylbenzene admixed with about 0.25 to 1 weight per cent of a hydrocarbon hydroperoxide to an oxidation zone, adding an oxygen-containing medium to said zone until a portion of the said tert-butylisopropylbenzene is oxidized to tert-butylisopropylbenzene hydroperoxide, maintaining said zone at a temperature of about 150° to about 400° F. and under a pressure greater than one atmosphere, passing the resulting oxidation effluent from said oxidation zone to a separation zone, admixing from 0.2 to 5 volumes of n-pentane with each volume of said oxidation effluent, cooling the last said mixture to a temperature between minus 100° and minus 15° F., and filtering the thus formed crystals of tert-butylisopropylbenzene hydroperoxide from the remainder of the mixture.

4. A process for producing tert-butylisopropylbenzene hydroperoxide which comprises passing tert-butylisopropylbenzene admixed with a small amount of an organic hydroperoxide oxidation initiator to an oxidation zone, adding an oxygen-containing medium to said zone, maintaining said zone at an elevated temperature and pressure, passing the resulting oxidation effluent from said oxidation zone to a separation zone, admixing substantial quantities of a low boiling hydrocarbon with said oxidation effluent, cooling the last said mixture to a sub-zero temperature, filtering the thus formed crystals of tert-butylisopropylbenzene hydroperoxide from the remainder of the mixture, washing said separated crystals with additional n-pentane and drying the resulting substantially pure crystalline tert-butylisopropylbenzene hydroperoxide.

5. The process of claim 4 wherein the low boiling hydrocarbon contains from 4 to 8 carbon atoms.

6. The process of claim 4 wherein the low boiling hydrocarbon is n-pentane.

7. A process for separating tert-butylisopropylbenzene hydroperoxide from an oxidation effluent containing a mixture of at least tert-butylisopropylbenzene and the said hydroperoxide which comprises passing the said oxidation effluent to a separation zone, admixing from 0.2 to 5 volumes of a low boiling hydrocarbon with each volume of said oxidation effluent, cooling the last said mixture to a sub-zero temperature and filtering the thus formed crystals of tert-butylisopropylbenzene hydroperoxide from the remainder of the mixture.

8. The process of claim 7 wherein the low boiling hydrocarbon is n-pentane.

9. The process of claim 7 wherein the low boiling hydrocarbon contains from 4 to 8 carbon atoms.

References Cited in the file of this patent

UNITED STATES PATENTS

| Number | Name | Date |
|---|---|---|
| 2,433,125 | Lorand et al. | Mar. 23, 1948 |
| 2,484,841 | Lorand | Oct. 18, 1949 |

FOREIGN PATENTS

| Number | Country | Date |
|---|---|---|
| 610,293 | Great Britain | Oct. 13, 1948 |